United States Patent [19]

Roux et al.

[11] 4,067,953
[45] Jan. 10, 1978

[54] PROCESS FOR UPGRADING ORES CONTAINING BADDELEYITE

[76] Inventors: Etienne Roux, 36 Jansen Singel; James Golden Goodey, 29 Alwyn Str., both of Phalaborwa, South Africa; Antoine M. Gaudin, deceased, late of Newtonville, Mass.; by Anna B. Gaudin, executrix, 32 Leonard Ave., Newtonville, Mass. 02160

[21] Appl. No.: 628,718

[22] Filed: Nov. 4, 1975

Related U.S. Application Data

[63] Continuation-in-part of Ser. No. 226,539, Feb. 15, 1972, abandoned.

[51] Int. Cl.² .................. C01G 25/00; C01G 27/00
[52] U.S. Cl. ...................... 423/80; 75/1 R; 75/1 T; 75/2; 423/20; 423/69; 423/81; 423/82; 423/151
[58] Field of Search .................. 75/1, 2, 1 T; 423/20, 423/69, 73, 80-82, 659 B, 151

[56] References Cited

U.S. PATENT DOCUMENTS

| | | | |
|---|---|---|---|
| 1,791,272 | 2/1931 | Iredell | 423/80 |
| 1,796,170 | 3/1931 | Tennilligin | 423/82 X |
| 2,084,630 | 6/1937 | Deguide | 423/81 |
| 2,127,664 | 8/1938 | Kinzie et al. | 423/80 X |
| 2,954,278 | 7/1960 | Gaskin et al. | 423/80 X |
| 3,112,178 | 11/1963 | Judd | 423/80 X |
| 3,552,914 | 1/1971 | Greinasher et al. | 423/82 X |
| 3,660,029 | 5/1972 | Naquib | 423/80 |
| 3,784,670 | 1/1974 | Kyoto et al. | 423/80 |

*Primary Examiner*—Herbert T. Carter
*Attorney, Agent, or Firm*—Behr & Woodbridge

[57] ABSTRACT

Minerals, for example, zirconium minerals, are subjected to a chemical process of comminution, in particular with the aid of strong acids. These acids dissolve the carbonatic and silicious cements which hold together the crystalline forms of different mineral species from one another, e.g., magnetic and non-magnetic species to render them amenable to further separation in a subsequent ore dressing stage, e.g., by high intensity magnetic separation. This process is operative as these cements dissolve in acid more readily than most of the other compounds of the ores. This separation was found to take place more effectively than by the usual methods of mechanical grinding and without the disadvantage of an unfavorable particle size distribution which results from grinding. It was found that the same process conditions also resulted in a particularly favorable removal of naturally occurring radioactive contaminants from the minerals, in particuar thorium and uranium. The process is particularly suitable for purifying the zirconium mineral baddeleyite, which is useful for ceramic and chemical industries.

22 Claims, 1 Drawing Figure

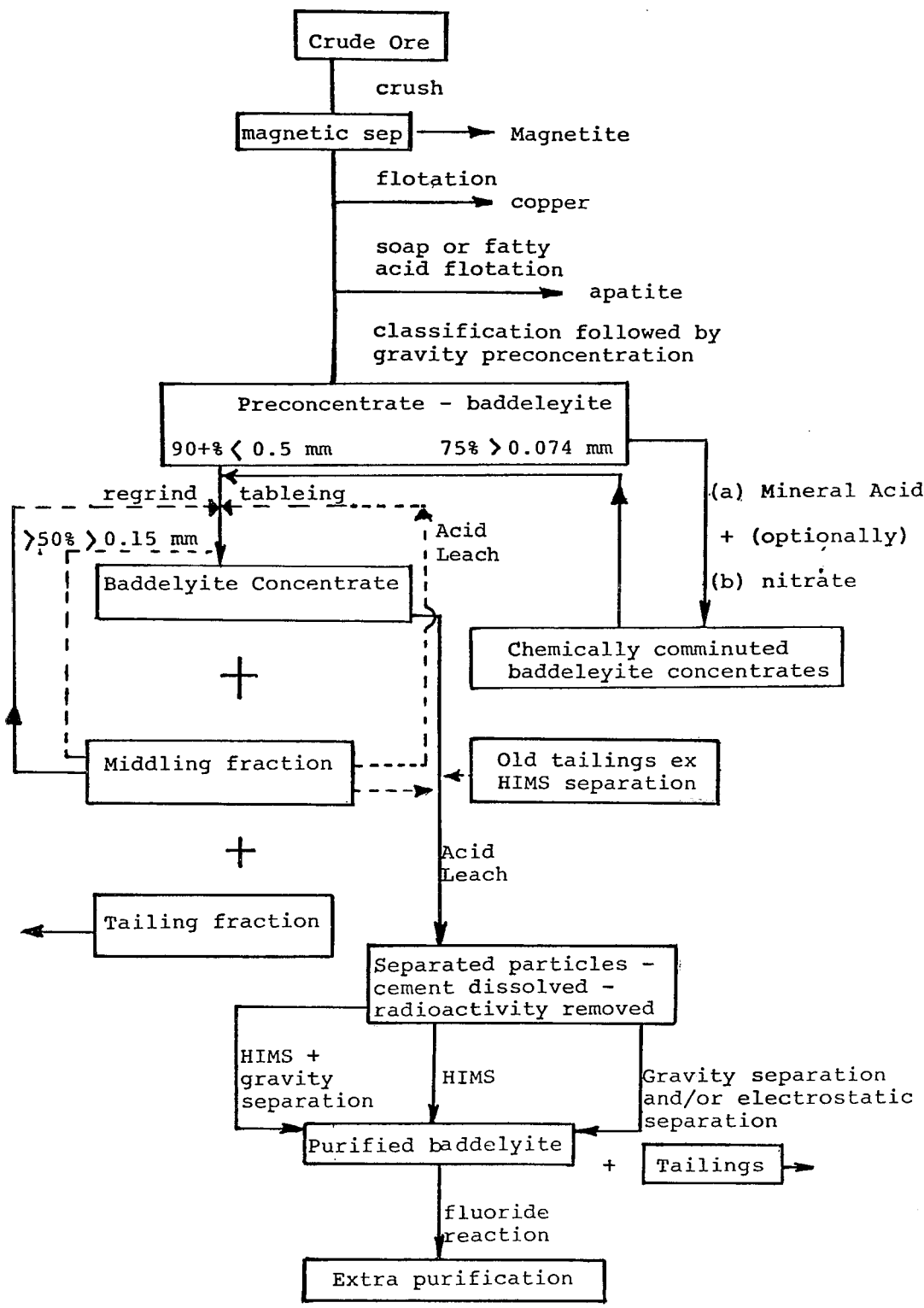

PROCESS FOR UPGRADING ORES CONTAINING BADDELEYITE

RELATED APPLICATIONS

This application is a continuation-in-part of application, Ser. No. 226,539, filed Feb. 15, 1972 and now abandoned.

BACKGROUND OF THE INVENTION

The present invention relates to the purification of minerals. More particularly, the invention may be applied to the purification of suitable heavy minerals, in particular, baddeleyite.

In the course of seeking suitable ore dressing methods for the purification of zirconium ores, in particular baddeleyite, difficulties were experienced in achieving a satisfactory liberation of different mineral species from one another for purposes of physical separation. Normally, grinding of the ore is resorted to for that purpose. However, grinding to an extent sufficient to liberate comparatively small strongly cohering particles of different mineral species from one another resulted in an unfavorable particle size distribution for subsequent ore dressing steps, in particular too high a content of fine particles.

One particular aspect of the invention is concerned with the purification of substantially chemically e.g., acid resistant minerals forming particles traversed by chemically, e.g., acid susceptible zones with which at least some of the impurities are associated, which impurities may themselves be chemically, e.g., acid resistant. Typical examples are to be found amongst certain non-magnetic, e.g., zirconium minerals, associated with magnetic minerals, e.g. ilmenite or ilmenite/magnetite, both components being acid resistant. It has been found surprisingly herein, that such associations are often held together by a cement, usually a carbonatic or silicious material, substantially more readily attached chemically, e.g. by acids than the resistant minerals just referred to, thus making it feasible to advantageously liberate the chemically resistant components from one another where previously mechanical grinding had to be resorted to with resultant undesirable particle size distribution.

A further aspect of the invention is based on the surprising discovery that substantially the same process conditions can be applied with particular success to free acid resistant heavy minerals, e.g. zirconium minerals, in particular baddeleyite from natural radioactive contamination, in particular thorium and uranium contamination.

The invention has proved itself particularly valuable in the context of upgrading baddeleyite occurring in low concentration in rocks of the Phalaborwa igneous complex (in particular the Foskorite and carbonatitite ores of the Loole Kop plug), in particular in association with apatite, biotite, bornite, brucite, calcite, chalcocite, pyrite, chondrodite, dolomite, ilmenite, magnetite, olevine, phlogopite, pyroxene, serpentine, spinel, valeriite and vermiculite in rocks usually associated with carbonatite intrusives, in particular, the rock which has become known as Foskorite. It is possible to obtain from such rocks concentrates of valuable minerals such as apatite and various copper minerals in such a manner that tailings are obtained which are suitable for the recovery of baddeleyite therefrom.

Whereas the process in accordance with the present invention has been found particularly suitable in connection with this particular problem of upgrading, the process is also considered suitable whenever baddeleyite of substantially similar mineralogical characteristics and with similar forms of contamination is found.

BRIEF DESCRIPTION OF THE PRIOR ART

Extension experiments have been carried out with the object of recovering and upgrading such baddeleyite as referred to above. Considerable success was attained by first concentrating the baddeleyite in a comparatively course state of comminution, then further comminuting the concentrate to further liberate and/or expose occluded contaminants and finally removing the thus exposed or liberated contaminants by chemical leaching, e.g. with aqueous acids as described in U.S. Pat. No. 3,552,914. It was eventually found advantageous to include a step of high intensity magnetic separation after the step of comminution, the marketable product then being either the baddeleyite concentrate purified by high intensity magnetic separation or that concentrate when further purified by the said chemical purification. In this context the difficulty was experienced that mechanical comminution to an extent sufficiently far-reaching to effectively liberate and/or expose the contaminants for effective removal by high intensity magnetic separation and/or effective chemical attack as then practiced, would result in a material too fine for effective high intensity magnetic separation. Moreover, it is not always desirable for the final product to be that highly comminuted from a marketing point of view. As a result a compromise solution was reached wherein the optimum particle size for high intensity magnetic separation constituted the limiting factor. As a result of this, the baddeleyite concentrate after high intensity magnetic separation was not as pure as it might have been, whilst excessive amounts of baddeleyite were lost in the tailings. Moreover, chemical leaching under comparatively mild conditions did not result in as much purification as might otherwise have been the case.

Another problem experienced has been that of uranium and thorium contamination which proved to be comparatively difficult and/or expensive to remove.

The present invention can be used to overcome or mitigate either or both of the aforementioned problems by an appropriate choice of parameters as will be shown in the following, and that is an object of the present invention.

It has now been discovered that some of the more bothersome contaminants are not so much occluded in the baddeleyite crystals themselves, but are bonded to those crystals by a cement and/or are occluded in the cement, presumably a carbonate and/or silicate cement by which these crystals are bonded together to form composite particles. Mechanical grinding will not liberate these contaminants without a degree of comminution being reached too fine for effective high intensity magnetic separation (or various alternative physical methods of separation).

SUMMARY OF THE INVENTION

In accordance with the invention there is provided a process for the purification of chemically resistant minerals which comprises comminuting particles of said minerals into smaller particles by a chemical breaking up step preparatory to a further physical or chemical ore dressing step.

More particularly the comminution is brought about by chemical attack on a cement, bonding together chemically more resistant mineral particles. More particularly, the chemical attack is carried out with a strong mineral acid.

Preferably the said chemical comminution is preceded by one or more physical concentrating steps and is followed by high intensity magnetic separation, either under dry or wet conditions, although dry conditions are at present preferred or electrostatic separation. The high intensity magnetic separation may in certain cases be followed by a further step of chemical upgrading, e.g. chemical leaching, preferably with appropriately chosen acid or acids and/or selective halogenation, usually chlorination.

BRIEF DESCRIPTION OF THE DRAWING

The FIGURE is a flow chart illustrating the alternative routes comprised in the present invention.

DESCRIPTION OF THE PREFERRED EMBODIMENTS

In the preferred embodiments of the invention there is utilized a natural zirconium ore. Said ore comprises composite particles, namely baddeleyite found in conjunction with other mineral materials. These other mineral materials are selected from the group consisting of paramagnetic and ferromagnetic minerals of iron, of titanium, such as ilmenite and of such radioactive materials comprising those of thorium and uranium.

The composite particles namely the baddeleyite on the one hand, and the other minerals on the other, are bonded together by a carbonatitic, or siliceous or carbonatitic and siliceous cement.

The cement is far more soluble in acid, in particular in mineral acid than the baddeleyite or the ilmenite.

In the basic procedures of the invention the ore is precrushed so that a major portion by weight (i.e. at least 50%) of the ore particles have a diameter of 0.1–0.5 mm as determined by screen analysis.

The foregoing major portion is then subjected to treatment with mineral acid. Any mineral acid may be employed, in particular a strong mineral acid such as sulfuric acid, hydrochloric acid or nitric acid.

The acids may be employed per se or in any combination thereof. It has been found suitable to employ strengths of between 2N and 7N, although the invention should not be limited thereto.

It has also been found helpful to introduce into the acid component, nitrate ion. The nitrate, when introduced, may be introduced either as nitric acid or as ammonium nitrate. The amount of nitrate ion will be most useful at between 6 and 150 g/liter of acid solution.

The treatment (with or without nitrate) can be carried out at temperatures down to say about 70° C, but preferably the treatment is carried out at a temperature of at least 85° C, preferably between 90° and 95° C. Higher temperatures may also be employed, however, provided that steps are taken to avoid losses of HCl, if such is present, e.g. by operating under reflux conditions. The treatment in the said temperature range is carried out preferably for a period of at least half an hour, preferably at least 1 hour.

After the treatment, the mineral is separated from the leached liquor in any suitable manner, and may be washed with aqueous rinsing liquids, preferably at least initially acidified, or subjected to further treatment for the removal of further impurities, e.g. leaching with another aqueous acid leaching liquor, selected for the removal of whatever other contaminants are to be removed.

A preferred embodiment comprises leaching a baddeleyite concentrate with a combination of sulphuric, hydrochloric and nitric acids to liberate ilmenite and baddeleyite particles from one another, followed by high intensity magnetic separation.

Particularly high purities were attained when leaching is carried out in two stages, namely one wherein the leach liquor is essentially hydrochloric acid containing also nitrate ion and one wherein the leach liquor is essentially sulphuric acid containing also nitrate ion. For improved recoveries when leaching is followed by high intensity magnetic separation, it is preferred that leaching with said hydrochloric acid precedes leaching with said sulphuric acid. This may also be achieved advantageously in that concentrated sulphuric acid is gradually added in the course of leaching to a leach liquor consisting essentially of aqueous hydrochloric acid containing nitrate.

The aforementioned leaching step achieves the first criterion of the invention namely the physical separation of the baddeleyite components from the other mineral components without the production of an unacceptable quantity of fines in a manner which retains the baddeleyite in commercially acceptable size particles.

As a result of the dissolution of the cement holding together the erstwhile components of the ore, a change occurs in the particle size distribution, namely, the production of components (as measured by screen distribution) having a diameter of 0.2–0.15 mm in diameter are reduced to between one-half to one-tenth of the original proportion of the whole and the proportion having a diameter of 0.15 to 0.074 mm is similarly increased. Interestingly enough the ratios both above and below these values are substantially unaffected.

The precise limits of particle sizes chiefly affected may of course be subject to certain variations from one ore deposit to another, as will be readily understood by those skilled in the art.

| Particle Diameter in mm | Preleach (1) % | Postleach (2) % |
|---|---|---|
| a) +0.5 | 5 | 5 |
| b) 0.5 0.2 | 25 | 25 |
| c) 0.2 0.15 | 25 | 5 |
| d) 0.15 0.74 | 35 | 55 |
| e) 0.74 and less | 10 | 10 |

The purpose of the foregoing Table is to illustrate that the particles "lost" from (c) (1) in the leach process reappear at (d) (2), rather than being an actual Example.

It is now desirable to separate the baddeleyite from the other mineral factors to which it is no longer physically attached. These methods are methods of physical separation and may be magnetic separation, gravity separation or a combination of magnetic and gravity separation or electrostatic separation alone or in combination with the aforegoing.

It is of interest that the leaching process not only separates the baddeleyite from the other minerals but actually dissolves out the major portion of the radioactive materials.

It is most desirable to subject the chemically comminuted material obtained as above to high intensity magnetic separation. This will remove the para and ferromagnetic contaminants and yield an ore of 98 to 99% zirconium oxide content containing at least 92% of the zirconium oxide content originally charged.

It is an important feature of this invention that up to this point the leaching solvents shall be fluoride free, which is contrary to the teaching of the prior art. However, where it is desired to obtain a very high degree of purity, in particular from phosphate or residual silicate, the HIMS treated residue may be washed with mineral acid, suitably sulfuric acid, more particularly 0.1N to 7N, preferably 1N to 5N, containing between 1 and 50 g/liter, preferably about 12 g/liter of fluoride ion. This secondary leach will dissolve out the phosphorous and convert residual titanium, and silicon to the corresponding florides which can be distilled off.

If copper sulphide is present this may be removed by the presence of an oxidizing agent, suitably nitrate ion, such addition of nitrate will only be needed if nitrate was not present in the previous wash step.

A further aspect of the invention is directed to pre-processing the baddeleyite ore to provide the suitable preconcentrate which is subjected to the acid leach processes discussed above.

The ore is coarse ground, the bulk of the magnetite removed, suitably by magnetic separation. Copper minerals are removed, suitably by flotation and apatite removed, suitably by soap or fatty acid flotation.

The initially treated material is set to pass substantially (i.e. more than 90%) thru a 35 mesh screen (0.5 mm diameter) and 75% of the weight is retained by 200 mesh (74 microns).

These materials are classified to remove the bulk of the slime, that is to say, all materials from 20 microns down.

The foregoing procedures are well known in the art and yield a product wherein between 90 and 95%, suitably 95% of the particles fall in a diameter category of 0.5 mm to 0.074 mm. This product is now subjected to an appropriate gravity preconcentration process, preferably a combination of three concentration steps using spirals and/or Reichert cones and yielding a more upgraded preconcentrate.

This preconcentrate is, in one preferred modification, subjected to table concentration to yield three factions, all predominantly in the particle diameter range 0.5 mm to 0.074 mm:

a. A heavy concentrate which assays at least 65% but normally no more than about 90%, and in general between 70 and 85% of baddeleyite, i.e. combined zirconium and hafnium oxides.

b. A middling fraction having a variable content of zirconium and hafnium oxides, usually more than 10% and less than 50%, but on average about 30%.

c. A tailing fraction assaying preferably less than 2%, and in most cases about 1% or even less combined zirconium and hafnium oxide.

The effect of tabling concentration is to separate minerals according to their specific gravities. The precise limits between which the average specific gravities of the above-mentioned three fractions can vary, are subject to the natural variations in the mineral compositions of different batches of ores and to the variations in specific gravities which occur even within individual mineral species.

Typically, the specific gravity of baddeleyite is between 5.5 and 5.6 and the main contaminant in the table concentrate is ilmenite having a specific gravity which can vary between 4.5 and 5.0. In practice the average specific gravity of the table concentrate may vary between about 5.1 and 5.5, more frequently between 5.26 and 5.48, being on average about 5.4.

In a typical case the tailing fraction of the table concentration step is composed almost entirely of calcite (specific gravity about 3.0) and olivine and serpentine minerals in the specific gravity range 3.0 to 3.2. Typically therefore, the specific gravity of the tailing may average between 3.0 and 3.4, more frequently between 3.0 and 3.3, and will usually be about 3.1.

The middling fraction will have an average specific gravity intermediate between that of the concentrate and that of the tailing, being mainly a mixture in which all the components of the concentrate and of the tailing are present, mostly in the form of composite particles. The average specific gravity can vary between about 3.4 and 5.3, but is more usually intermediate between 3.6 and 5.2 and lies typically in the range of about 3.8 to 4.2.

The tailing fraction is abandoned. The middling fraction may be returned directly to the tabling stage.

In a preferred modification, the middling fraction is reground so that 90 to 95% thereof pass through a 150 micron mesh size screen. In one further modification, the middling fraction is reground so that 90-95% thereof pass through a 150 screen mesh and the fraction returned to the tabling stage. The fine tailings as before are removed.

In another modification of this step, the middling fraction from the first tabling step is not reground but is subjected to the aforesaid acid leach procedures whereby the size range of said fraction is reduced from about one-half to one-tenth of the original weight falling in the 0.2 – 1.5 mm range to corresponding increase in the 0.15 to 0.074 mm range. This acid leached middling fraction is then returned to the tabling step.

Thereafter in the especially preferred modification of the process, the combined concentrate (including the concentrate from the recycled middling fraction) are subjected to the acid leach procedures discussed hereinabove to remove the cements and other relatively acid soluble materials, followed by the aforementioned magnetic separation step.

In yet another modification of the initial processing, the preconcentrate after removal of the initial magnetite, copper and apatite is treated with mineral acid in the manner described hereinabove optionally in the presence of nitrate. This effects a chemical comminution of the preconcentrate which is then subjected to table concentration in the manner hereinaforesaid table fractions are then further treated by further acid leaching, regrinding or combinations thereof.

The process may also be applied successfully to the recovery of further baddeleyite concentrate values from tailing of high intensity magnetic separation carried out after the aforesaid physical ore dressing steps and wherein the high intensity magnetic separation had been preceded by mechanical grinding only to the extent permissible for effective high intensity magnetic separation. In that case, the product of chemical comminution may be returned to high intensity magnetic separation, and in suitable cases it will be found that virtually no baddeleyite is lost in the final tailing. In a typical example the baddeleyite yield was increased in that way from 78% to 94%.

EXAMPLE I

Foskorite and carbonatite ore from the Loole Kop plug of the Phalaborwa igneous complex is coarse ground, subjected to the removal of the bulk of the magnetite by magnetic separation, followed by flotation of the copper minerals and soap or fatty acid flotation of the apatite. The tailings contain but 0.82% by weight of baddeleyite. Substantially all of the tailing passes a screen of 35 mesh (0.5 mm) size whilst 75% by weight is retained by a screen of 74 microns openings (200 mesh). The tailings are classified to remove therefrom the bulk of the slime, more particularly substantially all the material finer than 20 micron.

The classified sands are subjected to three steps of gravity concentration by either spirals or Reichert cones, the concentrate from each step being retreated in the succeeding step and the tailings from each step being returned to the preceeding step.

Optionally, the concentrate is once again subjected to magnetic concentration, the magnetic fraction being discarded.

The concentrate is subjected to table concentration to produce three products:
1. A baddeleyite concentrate assaying 85.54% combined zirconium and hafnium oxide, specific gravity: 5.48.
2. A middling fraction containing 30.09% combined zirconium and hafnium oxide, specific gravity: 3.99, and
3. A tailing containing 1.04% combined zirconium and hafnium oxide, specific gravity: 3.03.

The middling fraction is now reground to a fineness so that 95% passes through a 150 micron mesh size and is returned to the tabling step.

The final table concentrate containing 0.5% $ThO_2$ is now treated for 1½ hours at 93° C, with an acid leaching liquor, 6 to 7 Normal in respect of total mineral acid content, between 6 and 15 gram/liter of nitric acid being present, and the rest being hydrochloric and/or sulphuric acid. The consumption per kg of baddeleyite concentrate is 0.02 kg of $HNO_3$ and 0.5 kg of 33% HCl, or technical concentrated sulphuric acid (98%).

The acid is siphoned off and water is added with agitation and siphoned off again five times to wash the product. The residual moisture is drained off and the product is dried and subjected to high intensity magnetic separation. The final product contains about 98% combined zirconium and hafnium oxide, has a very low radioactivity and can readily be purified further by chemical leaching.

The leaching thorium oxide content is found to be less than 0.05%.

EXAMPLE II

The middling fraction of the table concentration in Example 1 is not reground but is instead subjected to acid treatment as described in Example 1, washed and returned to the table. The result of this acid treatment of the middling fraction is a physical release of the baddeleyite in particulate form from contaminating mineral particles which are present in the middling fraction attached to the baddeleyite in the form of composite particles strongly held together by a cement of siliceous and/or carbonatitic material. This breaking-up of the composite particles is manifested by the major portion of those particles in the middling fraction which prior to the acid treatment are in the size range of 0.2 through 0.15 mm diameter (as determined by screen analysis) to be broken up into particles in the size range of 0.15 to 0.074 mm diameter (also as determined by screen analysis).

The acid-treated middling fraction is returned to the table for further table concentration, resulting in an improved recovery of baddeleyite in the table concentrate. This combined table concentrate is then subjected to acid leaching followed by high intensity magnetic separation as described in Example 1.

EXAMPLE III

A baddeleyite concentrate similar to that in Example 1 containing about 89% zirconium oxide (including hafnium oxide) 0.1% uranium oxide, 0.22% thorium oxide and 2% titanium oxide, plus some residual magnetite was leached in two stages as follows: 200 kg of feed was leached for 30 minutes at 90° C with 53.3 kg water, 23.6 kg 33% HCl and 3 kg ammonium nitrate (the leach liquor contained 109 gram/liter HCl and 41 gram/liter ammonium nitrate).

After 30 minutes of leaching 74.6 kg of water, 50 kg of 98% sulphuric acid (280 gram/liter) and a further 3 kg of ammonium nitrate (18 gram/liter) were added. Leaching was continued for a further 60 minutes at 90° C with stirring. After that period the baddeleyite was allowed to settle out and the leach liquor was siphoned off, followed by three washes with water.

The above procedure was repeated numerous times, and the following are typical screen analysis before and after leaching:

TABLE I

|  | Non-Leached : % | Leached : % |
|---|---|---|
| + 35≠≠ | 5.55 | 5.30 |
| − 35 + 65≠≠ | 27.60 | 26.75 |
| − 65 + 100≠≠ | 26.20 | 7.05 |
| −100 + 200≠≠ | 35.60 | 54.10 |
| −200 + 325≠≠ | 4.15 | 5.00 |
| −325≠≠ | 0.93 | 1.85 |

TABLE II

|  | Non-Leached : % | Leached : % |
|---|---|---|
| + 35≠≠ | 0.35 | 0.35 |
| − 35 + 65≠≠ | 12.30 | 10.30 |
| − 65 + 100≠≠ | 20.00 | 2.30 |
| −100 + 200≠≠ | 56.00 | 73.90 |
| −200 + 325≠≠ | 10.00 | 11.40 |
| −325≠≠ | 1.25 | 1.35 |

The mesh sizes in Tables I and II correspond to the following approximate ranges of particle sizes:
− 35 + 65 mesh + = 0.5 − 0.2 mm − 65 100 mesh = 0.2 − 0.15 mm − 100 + 200 mesh = 0.15 − 0.074 mm Within these fractions it is well known that the complete range of particle size distribution is represented and that the overall particle size distribution approximates a Gauss-type distribution curve.

The data thus show that well over half by weight of the ore concentrate prior to leaching had a particle size larger than 0.1 mm (by screen analysis). In fact, in Table I well over half is larger than 0.15 mm. The data also show that the leaching step primarily causes a breaking-up of the particles in the size range between 0.2 and 0.15 mm, which is thus the fraction primarily affected by the features of the invention.

The product thus chemically comminuted was subjected to high intensity magnetic separation to result in a final product having a zirconium oxide content of between 98 and 99%. The recovery of zirconium oxide was consistently 92% or better. The residual uranium oxide content was between 0.04 and 0.06 and the residual thorium oxide content was consistently less than 0.05%. The residual titanium oxide content was 0.20% or less.

EXAMPLE IV

Example III was modified as follows:

To 200 kg of baddeleyite feed containing 76 kg water were added 20 kg of 33% HCl and 3.2 kg of ammonium nitrate. This was immediately followed by the gradual addition in the course of one hour of 20 kg 98% $H_2SO_4$. As a result of the exothermic dilution of the sulphuric acid the mix soon reached a temperature of 80–90° C and it was possible for the whole period of leaching of 60 minutes to maintain a temperature of 90° C with very little steam for heating. The results were consistently approximately the same as in Example III.

EXAMPLE V

Trailings retrieved from a dump, and representing the tailings of a high intensity magnetic separation, arrived at substantially as described in Example 1, but where said high intensity magnetic separation had been preceded by conventional regrinding instead of the acid leaching step, are subject to acid leaching as described in Example 1. The acid leaching results in a breaking-up of composite particles in the tailings and being composed of baddeleyite crystals cemented together with contaminating mineral matter. After washing and drying, the leached tailings are subjected to high intensity magnetic separation resulting in a further yield of baddeleyite equal to 21% of the baddeleyite recovery in the process from which the tailings had been obtained originally.

We claim:

1. A process for upgrading of ore containing baddeleyite in the form of crystals from the composite ore particles of the ore comprising the steps of
   i. leaching said composite ore particles, the major portion of said composite particles having a diameter of between 0.1 and 0.5 mm as determined by screen analysis, the composite particles in said portion comprising of:
   A. baddeleyite crystals
   B. other mineral materials selected from the group consisting of paramagnetic and ferromagnetic minerals of iron, of titanium comprising ilmenite, and of radioactive minerals comprising those of thorium and uranium, and
   C. a carbonatitic or siliceous or carbonatitic and siliceous cement bonding said baddeleyite to said other mineral materials, with mineral acid at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is corresponding increased,
   ii. magnetically treating the acid leached product of (i) by high intensity magnetic separation
   iii. and recovering non-magnetic purified particulate baddeleyite.

2. A process according to claim 1 wherein step (i) is carried out with liquid strong mineral acid of which the main acid component is selected from the group consisting of hydrochloric acid, sulphuric acid and nitric acid and combinations of such acids with one another.

3. A process of claim 2 wherein the total acid concentration is between 2 and 7 Normal.

4. A process according to claim 2 wherein step (i) is carried out at a temperature of at least 70° C.

5. A process according to claim 3 wherein the total acid concentration is between 2N and 7N and which contains at least 6 gram/liter of nitrate ion.

6. A process according to claim 5 wherein the process of step (i) is carried out at at least 85° C in the presence of between 6 and 150 g/liter of nitrate.

7. A process according to claim 1 wherein said strong mineral acid in step (i) is essentially fluoride-free.

8. A process for upgrading of ore containing baddeleyite in the form of crystals from the composite ore particles of the ore comprising the steps of
   i. leaching said composite ore particles, the major portion of said composite particles having a diameter of between 0.1 and 0.5 mm as determined by screen analysis, the composite particles in said portion consisting of:
   A. baddeleyite crystals
   B. other mineral materials selected from the group consisting of paramagnetic and ferromagnetic minerals of iron, of titanium comprising ilmenite, and of radioactive minerals comprising those of thorium and uranium, and
   C. a carbonatitic or siliceous or carbonatitic and siliceous cement bonding said baddeleyite to said other mineral materials, with mineral acid at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is corresponding increased,
   ii. gravity separating the acid leached product of (i)
   iii. and recovering non-magnetic purified particulate baddeleyite.

9. A process for upgrading of ore containing baddeleyite in the form of crystals from the composite ore particles of the ore comprising the steps of
   i. leaching said composite ore particles, the major portion of said composite particles having a diameter of between 0.1 and 0.5 mm as determined by screen analysis, the composite particles in said portion consisting of:
   A. baddeleyite crystals
   B. other mineral materials selected from the group consisting of paramagnetic and ferromagnetic minerals of iron, of titanium comprising ilmenite, and of radioactive minerals comprising those of thorium and uranium, and
   C. a carbonatitic or siliceous or carbonatitic and siliceous cement bonding said baddeleyite to said other mineral materials,
   with mineral acid at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is corresponding increased,
   ii. magnetically treating and gravity separating the acid leached product of (i)

iii. and recovering non-magnetic purified particulate baddeleyite.

10. A process as claimed in claim 9 carried out on baddeleyite at a temperature of at least 85° C with an acid leach liquid containing between 6 and 150 gram/liter of nitrate ion.

11. A process as claimed in claim 9 wherein the leaching liberates ilmenite and baddeleyite particles from one another, those particles being then separated by high intensity magnetic separation.

12. A process as claimed in claim 11, wherein leching is carried out in two stages, namely one wherein the leach liquor is essentially hydrochloric acid containing also nitrate ion and one wherein the leach liquor is essentially sulphuric acid containing also nitrate ion.

13. A process as claimed in claim 12 wherein leaching with hydrochloric acid precedes leaching with said sulphuric acid.

14. A process as claimed in claim 13 wherein concentrated sulphuric acid is gradually added in the course of leaching to a leach liquor consisting of aqueous hydrochloric acid containing nitrate.

15. A process as claimed in claim 9 wherein at least half the mineral material being treated has a particle size larger than 0.15 mm.

16. A process for upgrading of ore containing baddeleyite in the form of crystals from the composite ore particles of the ore comprising the steps of
   i. leaching said composite ore particles, the major portion of said composite particles having a diameter of between 0.1 and 0.5 mm as determined by screen analysis, the composite particles in said portion consisting of:
   A. baddeleyite crystals
   B. other mineral materials selected from the group consisting of paramagnetic and ferromagnetic minerals of iron, of titanium comprising ilmenite, and of radioactive minerals comprising those of thorium and uranium, and
   C. a carbonatitic or siliceous or carbonatitic and siliceous cement bonding said baddeleyite to said other mineral materials,
   with strong mineral acid of which the main acid component is selected from the group consisting of hydrochloric acid, sulphuric acid, and nitric acid and combinations of such acids with one another, of which the total acid concentration is between 2N and 7N at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is correspondingly increased
   and
   ii. recovering the thus separated baddeleyite crystals from the acid leach:

17. A process for upgrading of ore containing baddeleyite in the form of crystals from composite ore particles of the ore comprising the steps of
   i. leaching said composite ore particles, the major portion of said composite particles having a diameter of between 0.1 and 0.5 mm as determined by screen analysis, the composite particles in said portion consisting of:
   A. baddeleyite crystals
   B. other mineral materials selected from the group consisting of paramagnetic and ferromagnetic minerals of iron, of titanium comprising ilmenite, and of radioactive minerals comprising those of thorium and uranium, and
   C. a carbonatitic or siliceous or carbonatitic and siliceous cement bonding said baddeleyite to said other mineral materials,
   with
   a. a substantially fluoride free mineral acid at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is corresponding increased, then with
   b. a mineral acid containing fluoride ion under othewise similar reaction conditions as in step (a)
   ii. magnetically treating the acid leached product of (i) by high intensity magnetic separation
   iii. and recovering non-magnetic purified particular baddeleyite.

18. A process for upgrading of ore containing baddeleyite in the form of crystals from composite ore particles of the ore comprising the steps of
   i. comminuting an ore comprising the zirconium ore mineral baddeleyite, thereby to provide composite ore particles in admixture with minerals including apatite and magnetite,
   ii. removing the bulk of magnetite and apatite from the comminuted composite ore particles to provide a concentrate composed of particles, the major portion of which have diameters of 0.074 to 0.5 mm as determined by screen analysis,
   iii. subjecting said concentrate to gravity concentration to yield:
   a. a particulate baddeleyite concentrate containing zirconium and hafnium oxides as the major portion,
   b. a middling fraction of particulate material (R) containing zirconium and hafnium oxides in lesser concentration than the concentrate and including composite ore particles containing baddeleyite
   c. a tailings fraction of particulate material (S) containing only such portions of zirconium and hafnium oxide which escaped recovery in the concentrate and middling fractions, and
   iv. comminuting said middling fraction and recycling it in gravity concentration to yield additional baddeleyite concentrate, such concentrate which includes the concentrate of (iii)a being composed of particles more than half of which by weight are greater than 0.15 millimeters in size
   v. leaching said composite ore particles of (iv) supra, the major portion of said composite particles having a diameter of between 0.1 and 0.5 mm as determined by screen analysis, the composite particles in said portion consisting of:
   A. baddeleyite crystals
   B. other mineral materials selected from the group consisting of paramagnetic and ferromagnetic minerals of iron, of titanium comprising ilmenite, and of radioactive minerals comprising those of thorium and uranium, and C. A carbonatitic or siliceous or carbonatitic and siliceous cement bonding said baddeleyite to said other mineral materials, with mineral acid at elevated temperarture not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is correspondingly increased, vi. magnetically treating the acid leached product of (i) by high intensity magnetic separation vii. and recovering non-magnetic purified particulate baddeleyite.

19. A process for upgrading of ore containing baddeleyite in the form of crystals from composite ore particles of the ore comprising the steps of
    i. comminuting an ore comprising the zirconium ore mineral baddeleyite, thereby to provide composite ore particles in admixture with minerals including apatite and magnetite,
    ii. removing the bulk of magnetite and apatite from the comminuted composite ore particles to provide a concentrate composed of particles, the major portion of which have diameters of 0.074 to 0.5 mm as determined by screen analysis,
    iii. subjecting said concentrate to gravity concentration to yield:
        a. a particulate baddeleyite concentrate containing zirconium and hafnium oxides as the major portion,
        b. a middling fraction of particulate material (R) containing zirconium and hafnium oxides in lesser concentration than the concentrate and including composite ore particles containing baddeleyite
        c. a tailings fraction of particulate material (S) containing only such portions of zirconium and hafnium oxide which escaped recovery in the concentrate and middling fractions, and
    iv. leaching said middling fraction composite ore particles, the major portion of said composite particles having a diameter of between 0.1 and 0.5 mm as determined by screen analysis, the composite particles in said portion consisting of:
    A. baddeleyite crystals
    B. other mineral materials selected from the group consisting of paramagnetic and ferromagnetic minerals of iron, of titanium comprising ilmenite, and of radioactive minerals comprising those of thorium and uranium, and
    C. a carbonatitic or siliceous or carbonatitic and siliceous cement bonding said baddeleyite to said other mineral materials,
    with a mineral acid at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is correspondingly increased,
    v. magnetically treating the acid leached product of (i) by high intensity magnetic separation vi. and recovering non-magnetic purified particulate baddeleyite.

20. A process for upgrading of ore containing baddeleyite in the form of crystals from the composite ore particles of the ore comprising the steps of
    i. comminuting an ore comprising the zirconium ore mineral baddeleyite, thereby to provide composite ore particles in admixture with minerals including apatite and magnetite,
    ii. removing the bulk of magnetite and apatite from the comminuted ore particles to provide a preconcentrate composed of particles, the major portion of which have diameters of 0.074 to 0.5 mm as determined by screen analysis.
    iii. subjecting said preconcentrate to gravity concentration to yield:
        a. a particulate baddeleyite concentrate containing zirconium and hafnium oxides as the major portion,
        b. a middling fraction of particulate material (R) containing zirconium and hafnium oxides in lesser concentration than the concentrate and including composite ore particles containing baddeleyite, the major portion of said composite particles having a diameter of between 0.1 and 0.5 mm as determined by screen analysis, the composite particles in said portion consisting of:
    A. baddeleyite crystals
    B. other mineral and materials selected from the group consisting of paramagnetic and ferromagnetic minerals of iron, of titanium comprising ilmenite, and of radioactive minerals comprising those of thorium and uranium, and
    C. a carbonatitic or siliceous or carbonatitic and siliceous cement bonding said baddeleyite to said other mineral materials,
        c. a tailings fraction of particulate material (S) containing only such portions of zirconium and hafnium oxide which escaped recovery in the concentrate and middling fraction,
    iv. subjecting said middling fraction to leaching with mineral acid to physically release the baddeleyite in particulate form from said other mineral of the composite particles, also in particulate form, thereby converting the major portion of those particles in said middling fraction which prior to said leaching are in a size range of 0.2 through 0.15 mm diameter, so as to after said leaching be in a size range of 0.15 to 0.074 mm diameter as determined by screen analysis;
    v. recycling the product of step (iv) to step (iii), and
    2. subjecting the concentrate of step (iii) which includes reconcentrated product of combined steps (v) and (i) to high intensity magnetic separation to remove particles therefrom which are attracted under the conditions of said high intensity magnetic separation, and to leave behind purified baddeleyite composite ore particles and
    recovering non-magnetic purified particulate baddeleyite.

21. A process for upgrading of ore containing baddeleyite in the form of crystals from the composite ore particles of the ore comprising the steps of
    i. leaching said composite ore particles, the major portion of said composite particles having a diameter of between 0.1 and 0.5 mm as determined by screen analysis, the composite particles in said portion consisting of:
A. baddeleyite crystals
B. other mineral materials selected from the group consisting of paramagnetic and ferromagnetic minerals of iron, of titanium comprising ilmenite, and of radioactive minerals comprising those of thorium and uranium, and
C. a carbonatitic or siliceous or carbonatitic and siliceous cement bonding said baddeleyite to said other mineral materials, with mineral acid at elevated temperature not exceeding acid reflux temperature to dissolve said cement until said baddeleyite is separated from said other mineral materials and the size composition of the mineral material between 0.2 and 0.15 millimeters is reduced to less than half its original value and material in the size range of 0.15 millimeters to 0.074 millimeters in diameter is corresponding increased,
ii. passing the acid leached product of (i) through an elastrostatic field gradient,
iii. and recovering non-attracted purified particulate baddeleyite passed through said field.

22. A process for upgrading of ore containing baddeleyite in the form of crystals from composite ore particles of the ore comprising the steps of
1. i. comminuting an ore comprising the zirconium ore mineral baddeleyite, thereby to provide composite ore particles in admixture with minerals including apatite and magnetite,
ii. removing the bulk of magnetite and apatite from the comminuted composite ore particles to provide a preconcentrate composed of particles, the major portion of which have diameters of 0.074 to 0.5 mm as determined by screen analysis,
iii. subjecting said preconcentrate to leaching with mineral acid to physically release the baddeleyite in particulate form from said other mineral of the composite particles, also in particulate form,
iv. subjecting said preconcentrate to gravity concentration to yield:
   a. a particulate baddeleyite concentrate containing zirconium and hafnium oxides as the major portion,
   b. a middling fraction of particulate material (R) containing zirconium and hafnium oxides in lesser concentration than the concentrate and including composite ore particles containing baddeleyite,
   c. a tailings fraction of particulate material (S) containing only such portions of zirconium and hafnium oxide which escaped recovery in the concentrate and middling fraction,
v. recycling the product (b) of step (iv) to the beginning of step (iv), and
2. i. leaching said concentrate of step (iv) (a) which includes preconcentrated product of combined steps (v) and (iv), the major portion of said concentrate particles having a diameter of between 0.1 and 0.5 mm as determined by screen analysis, the composite particles in said portion consisting of:
   a. baddeleyite crystals
   b. other mineral materials selected from the group consisting of paramagnetic and ferromagnetic minerals of iron, of titanium comprising ilmenite, and of radioactive minerals comprising those of thorium and uranium, and
   c. a carbonatitic or siliceous or carbonatitic and siliceous cement bonding said baddeleyite to said other mineral materials, with mineral acid at elevated temperature not exceeding acid reflux temperature to dissolve said cement until said baddeleyite is separated from said other mineral materials and the size composition of the mineral material between 0.2 and 0.15 millimeters is reduced to less than half its original valve and material in the size range of 0.15 millimeters to 0.074 millimeters in diameter is correspondingly increased,
ii. magnetically treating the acid leached product of (i) by high intensity magnetic separation,
iii. and recovering non-magnetic purified particulate baddeleyite.

* * * * *